United States Patent
Bürgel

(10) Patent No.: US 10,569,983 B2
(45) Date of Patent: *Feb. 25, 2020

(54) APPARATUS AND METHOD FOR TRANSPORT OF BALANCING WEIGHTS

(71) Applicant: Wegmann automotive GmbH, Veitshöchheim (DE)

(72) Inventor: Hans-Ulrich Bürgel, Roden (DE)

(73) Assignee: Wegmann automotive GmbH, Veitschöchheim (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/813,489

(22) Filed: Nov. 15, 2017

(65) Prior Publication Data

US 2018/0072527 A1 Mar. 15, 2018

Related U.S. Application Data

(63) Continuation of application No. 14/493,812, filed on Sep. 23, 2014, now Pat. No. 9,840,388, which is a continuation of application No. PCT/EP2013/055037, filed on Mar. 12, 2013.

(30) Foreign Application Priority Data

Mar. 23, 2012 (EP) .................................. 12160991
Jul. 13, 2012 (EP) .................................. 12176444

(51) Int. Cl.
*B65H 20/02* (2006.01)
*G01M 1/32* (2006.01)
(Continued)

(52) U.S. Cl.
CPC ......... *B65H 20/02* (2013.01); *B65H 35/0006* (2013.01); *F16F 15/324* (2013.01); *G01M 1/326* (2013.01); *B65H 2701/1942* (2013.01)

(58) Field of Classification Search
CPC ........ B65H 20/02; B65H 20/06; B65H 20/20; B65H 2801/51; B65H 2404/12;
(Continued)

(56) References Cited

U.S. PATENT DOCUMENTS 3,960,409 A  6/1976 Songer
6,616,089 B2  9/2003 Gross
(Continued)

FOREIGN PATENT DOCUMENTS

DE    75 14 258       9/1980
EP    1128176 A2 *   8/2001  ............ F16F 15/328
(Continued)

OTHER PUBLICATIONS

Machine translation of EP 1128176 (Year: 2001).*
(Continued)

*Primary Examiner* — Michael C McCullough
(74) *Attorney, Agent, or Firm* — Norton Rose Fulbright US LLP

(57) ABSTRACT

Apparatus and a method for transporting and positioning of balancing weights connected together to form a chain of balancing weights is disclosed. A drive means comprises at least a transport wheel and/or a transport belt. The drive means has at least one cam to interface with a gap between two adjacent balancing weights of the chain of balancing weights. Furthermore a cutter may be provided for cutting of balancing weights from the chain.

20 Claims, 7 Drawing Sheets

(51) Int. Cl.
*F16F 15/32* (2006.01)
*B65H 35/00* (2006.01)

(58) Field of Classification Search
CPC ...... B65H 2404/1115; B65H 2404/122; B65H 2404/2322; B65H 2701/1942; F16F 15/32; F16F 15/324; G01M 1/32; G01M 1/326
See application file for complete search history.

(56) References Cited

U.S. PATENT DOCUMENTS

| | | |
|---|---|---|
| 7,931,342 B2 | 4/2011 | Spaulding |
| 2003/0079963 A1 | 5/2003 | Zimmermann |
| 2010/0059154 A1 | 3/2010 | Perecman |

FOREIGN PATENT DOCUMENTS

| | | |
|---|---|---|
| EP | 1 355 084 | 10/2003 |
| EP | 2 060 659 | 5/2009 |
| GB | 1501781 | 2/1978 |
| WO | WO/08/103651 | 8/2008 |

OTHER PUBLICATIONS

International Search Report and Written Opinion in International Application No. PCT/EP2013/055037 dated Jun. 28, 2013.
International Preliminary Report on Patentability in International Application No. PCT/EP2013/055037 dated Sep. 23, 2014.
Extended European Search Report in European Application No. 12176444.3 dated Jan. 25, 2013.
Communication pursuant to Article 94(3) EPC in European Application No. 12176444.3 dated Mar. 13, 2014.

\* cited by examiner

APPARATUS AND METHOD FOR TRANSPORT OF BALANCING WEIGHTS

PRIORITY CLAIM

This application is a continuation of U.S. patent application Ser. No. 14/493,812, filed Sep. 23, 2014, which is a continuation of pending International Application No. PCT/EP2013/055037 filed on Mar. 12, 2013, which designates the United States and claims priority from European Application No. 12160991.1 filed on Mar. 23, 2012 and European Application No. 12176444.3 filed on Jul. 13, 2012, all of which are incorporated by reference in their entireties.

BACKGROUND OF THE INVENTION

1. Field of the Invention

The invention relates to methods and devices for handling and transporting weights used in vehicle balancing applications, in particular for dispensing weights used in balancing automobile or other vehicle wheels.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This has the drawback that a solid balancing weight is significantly more robust and reliable than these continuous tapes.

DE 75 14 258 discloses a roller press for manufacturing balancing weights.

SUMMARY OF THE INVENTION

The embodiments are based on the object of providing an apparatus and a method for automated transport of vehicle balancing weights. Another object is to provide an apparatus and a method for automated trimming of vehicle balancing weights. A further object is to provide balancing weights for automated transport and for automated trimming.

A first embodiment relates to balancing weights for automated transport. Such balancing weights preferably are attached to a transport tape which may preferably be an adhesive tape for attaching the balancing weights to a rim. In a first embodiment, the balancing weights are individual weights at a distance from each other to allow for bending of the tape at at least one axis, preferably at two axes under a right angle. In a further embodiment there may be any kind of balancing weights known from the art attached to a tape or belt.

It is further preferred, if the balancing weights have slanted sides, which further simplifies handling and bending of the balancing weights.

In a further embodiment, the balancing weights are connected by a bridge, preferably from the same material as the balancing weights. Such balancing weights may also be supported by a tape which also may serve as an adhesive tape. Generally, a tape support of balancing weights connected by a bridge is not necessary. In a further embodiment the bridge may comprise a material, preferably a material which is used for covering the surface of the balancing weights. This may be any polymer like epoxy.

Generally, herein the term "chain of balancing weights" is used for the embodiments described above and for all other embodiments, where a plurality of balancing weights are connected with each other like a chain.

A further embodiment relates to transporting of the chain of balancing weights which are connected to each other. For transport of the balancing weights, a drive means, preferably a transport wheel or transport belt interacting with a surface of the balancing weights and/or a tape may be used. The transport wheel and/or transport belt may have a soft and/or flexible surface, preferably softer than the balancing weights. It further may have at least one cam fitting into a space between two adjacent balancing weights. Generally, the at least one cam may synchronize with any other structure of the chain of balancing weights, like holes or parts of the balancing weights or of a tape. Due to the cams, there is no slip between the transport wheel and/or transport belt and the balancing weights. This allows for precision positioning the balancing weights. Furthermore, precision measurement of the length of balancing weights may be done. Therefore, a large number of balancing weights may be counted without error. For counting and/or measuring, a cam sensor, sensing the cams of the transport wheel and/or transport belt may be provided. It may count the cams of the transport wheel and/or transport belt passing by. This sensor may be an optical or magnetic sensor. There may further be a sensor for counting the gaps between adjacent balancing weights. This may also be a magnetic or optical sensor, or any other sensor known in the art. The transport wheel is different from a roller press. While a roller press generates pressure under a right angle to the transport direction on the surface of the balancing weights, the drive means or the wheel preferably generates no pressure on the surface. Instead it pushes the balancing weights forward, parallel to the transport direction. Furthermore, the balancing weights are not deformed or shaped by the drive means. Preferably, the balancing weights enter the drive means at a first side and leave the drive means unmodified at a second side.

In a further embodiment, a pair of drive means like transport wheels and/or transport belts may be provided for contacting opposing sides of the balancing weights, and therefore generating enough friction to move the balancing weights. These transport wheels and/or transport belts may apply force to any opposing sides, like top and bottom or right and left side of the balancing weights.

It is further preferred, if the balancing weights are supported by a guide keeping the balancing weights within a predetermined track.

A further embodiment relates to means for transporting of the balancing weights over larger distances. Here, pulling force to the balancing weights may not exceed the maximum force capability of the tape and/or of the bridges between the balancing weights. If this maximum force is exceeded, the tape and/or the bridges would break, and the transport would be interrupted. Therefore the transport requires guides providing low friction and means for pulling the tape in a way to prevent excessive force.

For supporting the balancing weights, a simple support plate or rail may be provided. This may be coated with a low-friction coating like PTFE (Polytetrafluoroethylene). A slide rail may also have a U-shape, which may bear the balancing weights horizontally or vertically.

A further embodiment uses magnetic bearing or magnetic suspension of the balancing weights. This is preferably applicable to iron balancing weights. Here, the magnetic force of the magnet, like a permanent magnet or a magnet coil, may be guided by at least one yoke towards the balancing weights. Furthermore, it is preferred to have a spacer between the balancing weights and the yoke to control magnetic flux and therefore prevent the balancing weights from sticking to the yokes. Such a magnetic suspension would allow merely frictionless transport of the balancing weights.

For transporting balancing weights over large distances, it is preferred, if a plurality of transport wheels and/or belts are used to lower the force applied on the balancing weights. Preferably, these transport wheels and/or belts are driven synchronously. If there is no synchronous transport, there may be excessive force to the balancing weights, causing the tape and/or the bridges to break, if a first wheel is slower than the following wheel. For the case that a first wheel is faster than a following wheel, an excess length of the chain of balancing weights would build up. A necessary synchronization of driving wheels can hardly be done, when there are only friction-driving wheels. An improvement may be achieved by rotating a first wheel with a slightly lower speed than the following wheel, therefore causing some slip which also causes wear of the wheels and may damage the surface of balancing weights. By using inventive transport wheels and/or belts having cams, a synchronization is very simple, as there is no slip between wheels and balancing weights, and therefore a very precise spatial relationship may be maintained. Synchronization of a plurality of transport views and/or belts may be made by a simply mechanical gear or by electronic drive means.

In a further embodiment, a combination of two transport wheels and/or belts may be used to compensate for differences in transport speed and/or length. At least one of the transport wheels has transport cams to synchronize the movement of the balancing weights. Between the two transport wheels, there may be an excess length of balancing weights, which may vary and act as a buffer.

A further embodiment comprises an apparatus for delivering a specified mass of balancing weight. Alternatively, a specified length or size of balancing weight may be delivered. The mass or length or size of balancing weight to be delivered may be controlled by a controller of a wheel balancing machine. The apparatus comprises at least one means for precision positioning of balancing weights as disclosed herein. Such a means preferably is a transport wheel and/or a transport belt having cams to interact with the gaps between adjacent balancing weights. In a further embodiment, the at least one transport wheel or transport belt may have a structure on its surface which is corresponding to a structure of the balancing weights. Such a structure may be a structure of lines, a grid, holes, or even an engraved image.

Furthermore, the apparatus comprises at least one means for cutting off pieces from the balancing weights. Preferably, it cuts the tape between individual balancing weights. It may also cut balancing weights at bridges between balancing weights. In a further embodiment, it may cut balancing weights anywhere, thus releasing pieces of balancing weights. It is preferred, if the balancing weights are cut under a right angle to their direction of transport.

Preferably, there is a control unit which measures the length of transported balancing weights and controls the cutting device accordingly. The transported balancing weights may for example be measured by counting revolutions of the transport wheel and/or transport tape, counting the number of cams, measuring the length of balancing weights passed, or by counting gaps or bridges between the balancing weights.

A further embodiment relates to a method for at least one of transporting, delivering, driving and cutting of balancing weights as described above.

BRIEF DESCRIPTION OF THE DRAWINGS

In the following, the invention will be described by way of example, without limitation of the general inventive concept, on examples of embodiment and with reference to the drawings.

Figure 1A:
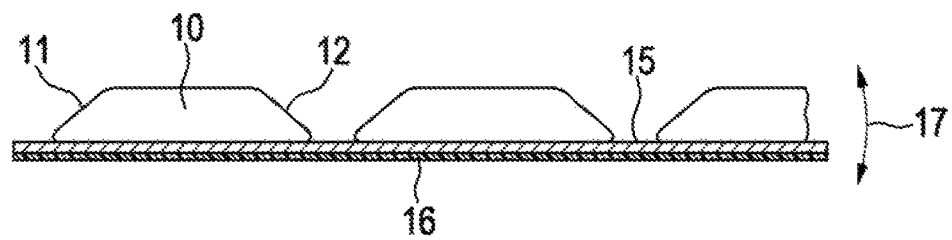
FIGS. 1a-d show chains of balancing weights.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIGS. 1a-d, chains of balancing weights are shown. In FIG. 1a, a plurality of individual balancing weights 10 having slanted sides 11, 12 are arranged on a tape 15. This tape may act as an adhesive tape for fixing the balancing weights to a rim. Furthermore, this tape may have a liner 16 to protect the adhesive surface opposite to the balancing weights. The chain of balancing weights may be bent at least at one axis. In this Figure, the axis is perpendicular to the drawing plane. The bending direction 17 is shown by the corresponding arrows. Bending in a second axis under a right angle may allow to make curves of the belt. This would be into or from the drawing plane.

Figure 1B:
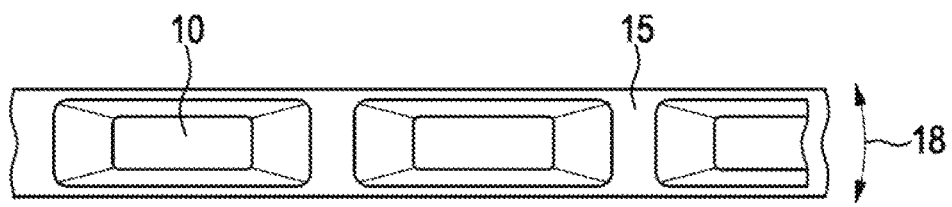

In FIG. 1b, a top view of the balancing weights is shown. Here, also the second bending axis is perpendicular to the drawing plane, resulting in a bending direction 18 as shown.

Figure 1C:
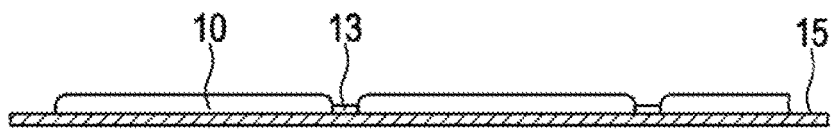
Figure 1D:
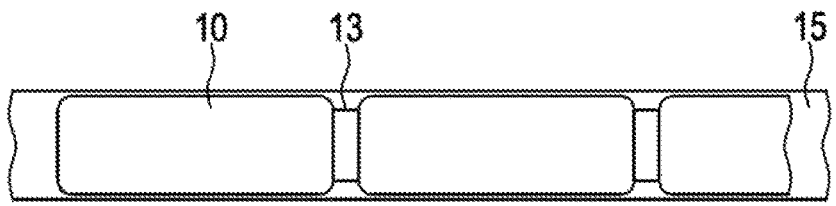

In FIGS. 1c and 1d, a further embodiment of balancing weights is shown. Here, the balancing weights 10 are connected by bridges 13. Preferably, the bridges 13 are made of the same material as the balancing weights. In a further preferred embodiment, the bridges may comprise a different material providing comparatively high flexibility. For example, the balancing weights may be coated with plastic epoxy or resin, and the bridges may also be made of this material. As explained with relation to the Figures before, it is preferred, if this embodiment of balancing weights is also bendable in one, and most preferably in two axes.

Figure 2:
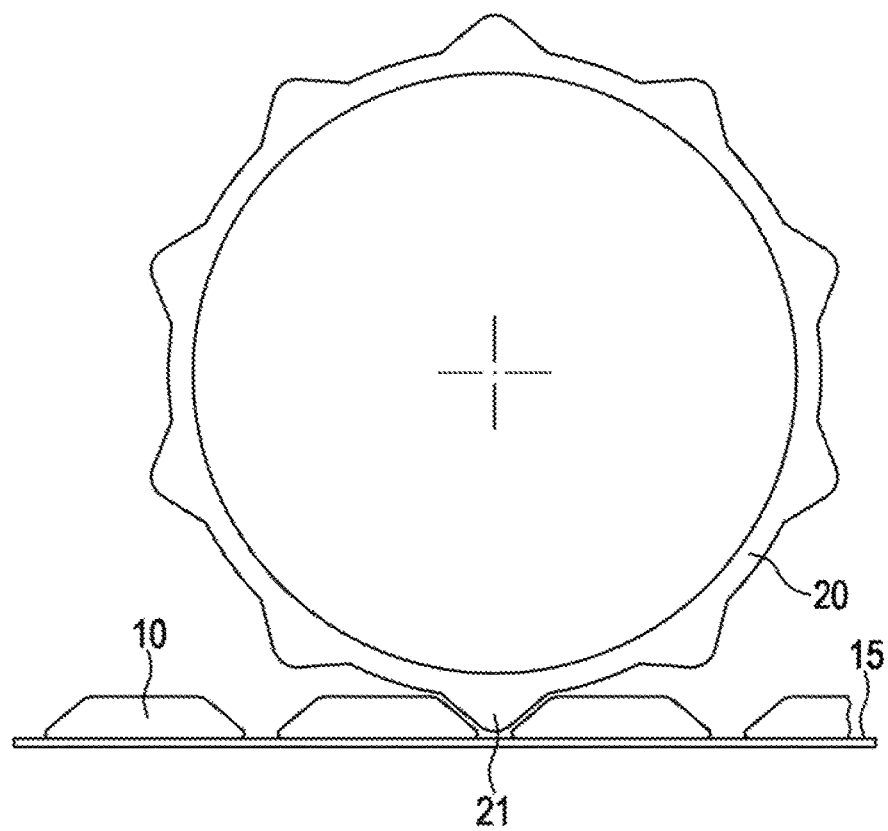
FIG. 2 shows a transport wheel for transporting balancing weights.

In FIG. 2, a transport wheel for transporting balancing weights is shown. The transport wheel 20 has at least one transport cam 21, which fits into the gaps between adjacent balancing weights 10. Preferably, the transport cams 21 have a shape that closely fits into the gap between adjacent balancing weights, and furthermore allows a rotating movement outwards of this gap. Furthermore, a cam sensor may be provided in the close proximity of transport wheel 20 for detecting the presence and/or the passage of a cam, and therefore allowing to count the number of balancing weights which has been transported by the transport wheel. Although this embodiment is shown with a first embodiment of the balancing weights, it may be used with other embodiments of balancing weights, like balancing weights having bridges.

Figure 3:
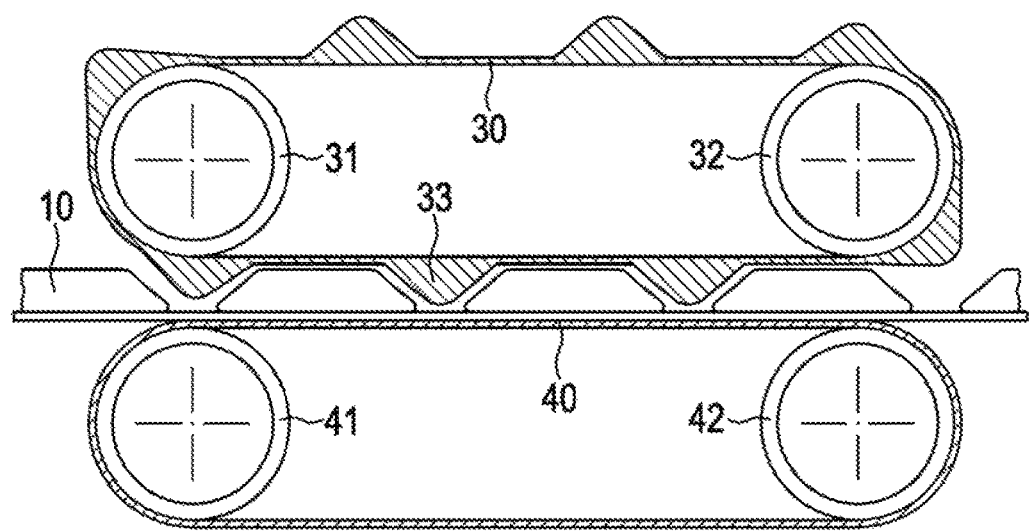
FIG. 3 shows a transport belt for transporting balancing weights.

In FIG. 3, a transport belt for transporting balancing weights is disclosed. A transport belt 30 has a plurality of transport cams 33, which interact with the gaps between adjacent balancing weights. The drive belt may be driven by at least one pulley 31, 32, which may be driven by a motor. Due to the interaction in a plurality of gaps between balancing weights, the mechanical tolerances are equalized, and a precision transport of balancing weights may be achieved. The transport belt may be combined with a support or a slide rail on the opposite side of the balancing weights, as shown later. It is preferred to combine this transport belt with a second support belt 40 which supports the opposing side of the balancing weights which may be a tape. The support belt 40 may be driven by support pulleys 41, 42, which preferably are operated synchronously to drive conveyer pulleys 31, 32. The support belt 40 may also be used without the transport belt 40. Although this embodiment is shown with a first embodiment of the balancing weights, it may be used with other embodiments of balancing weights, like balancing weights having bridges.

Figure 4:
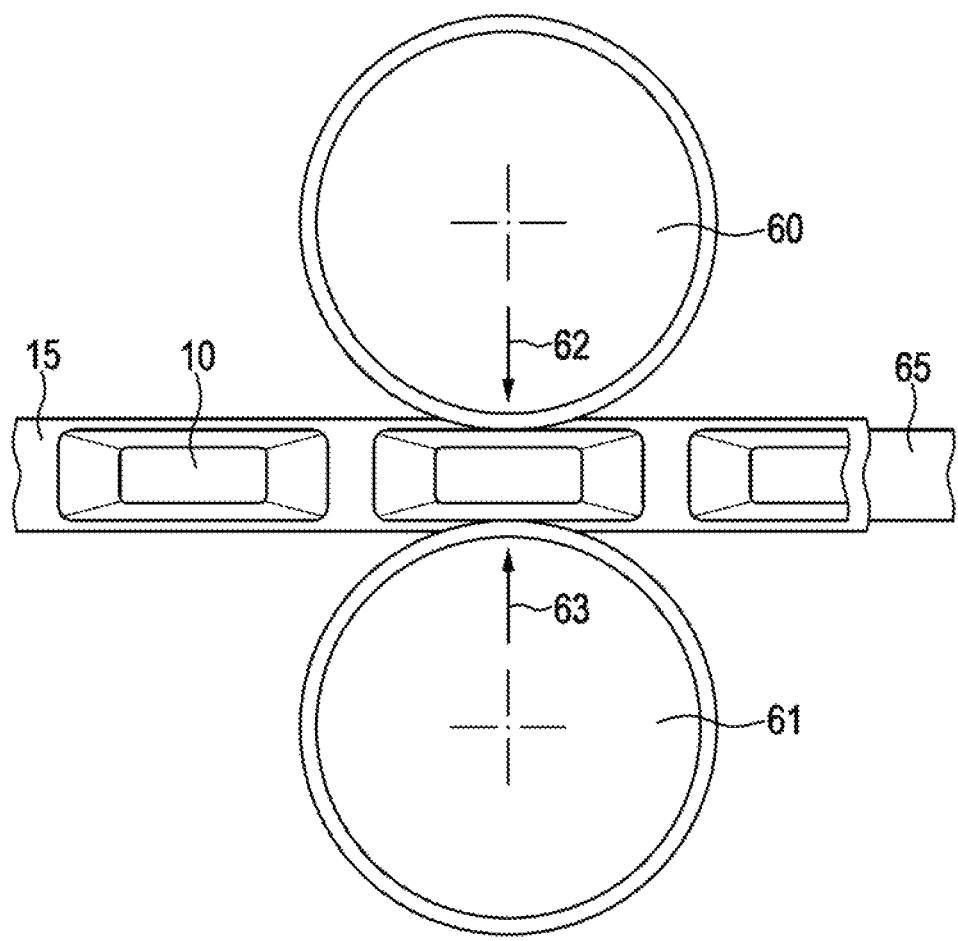
FIG. 4 shows a dual wheel drive or balancing weights.

In FIG. 4, a dual wheel drive for balancing weights is shown. Two wheels 60, 61 are arranged at opposing sides of balancing weights. The sides may be the top and bottom or right and left sides. Preferably, the transport wheels are connected to means providing a force 62, 63 towards the balancing weights. Most preferably, they are spring-loaded. The balancing weights may further be supported by a support rail 65, which may be a linear plate or one of the rails, as disclosed hereafter. The transport wheels may be friction-type wheels having a surface generating sufficient friction when being in contact with the balancing weights. The transport wheels may also have cams, as previously disclosed, to improve friction and precision.

Figure 5:
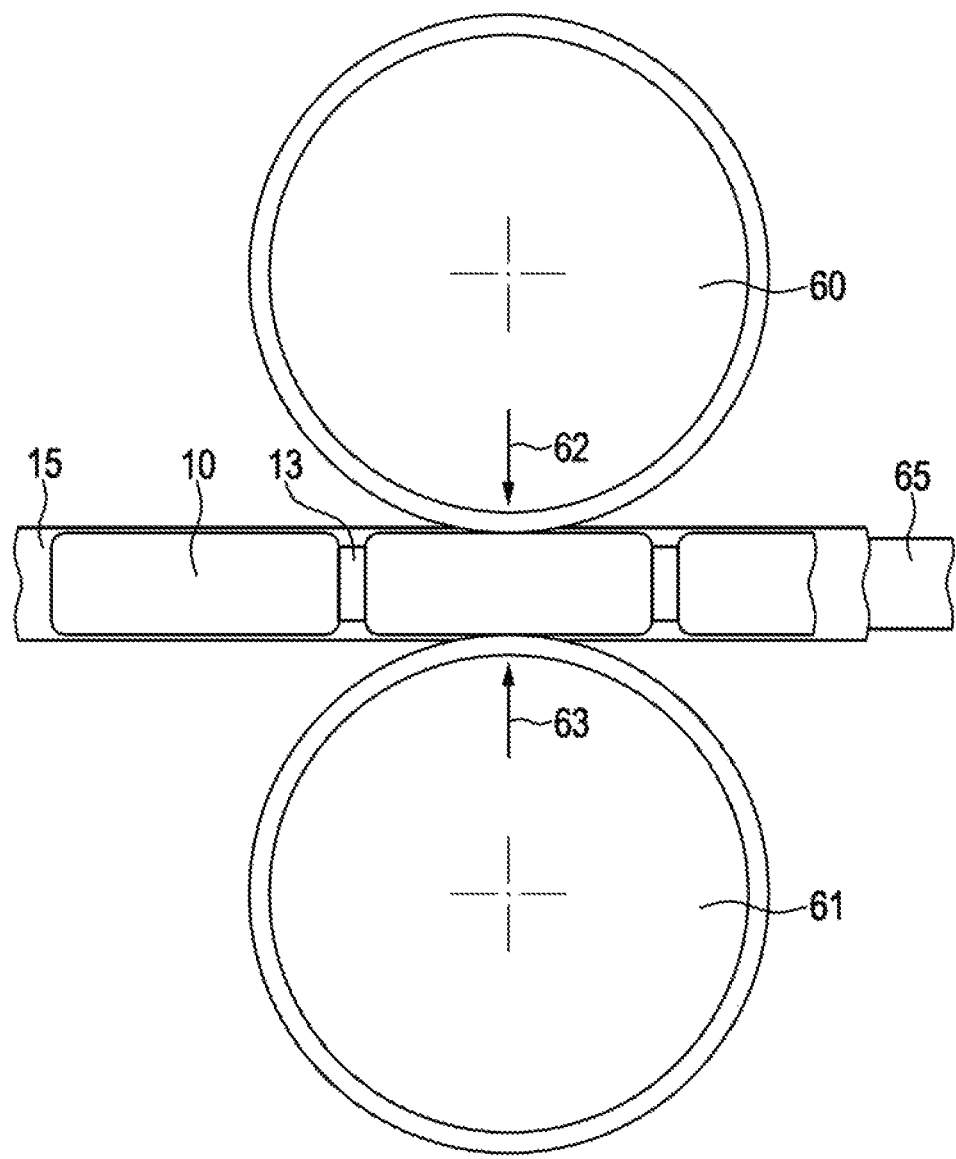
FIG. 5 shows a further dual wheel drive.

FIG. 5 shows a further dual wheel drive of balancing weights with a different type of balancing weights.

Figure 6:
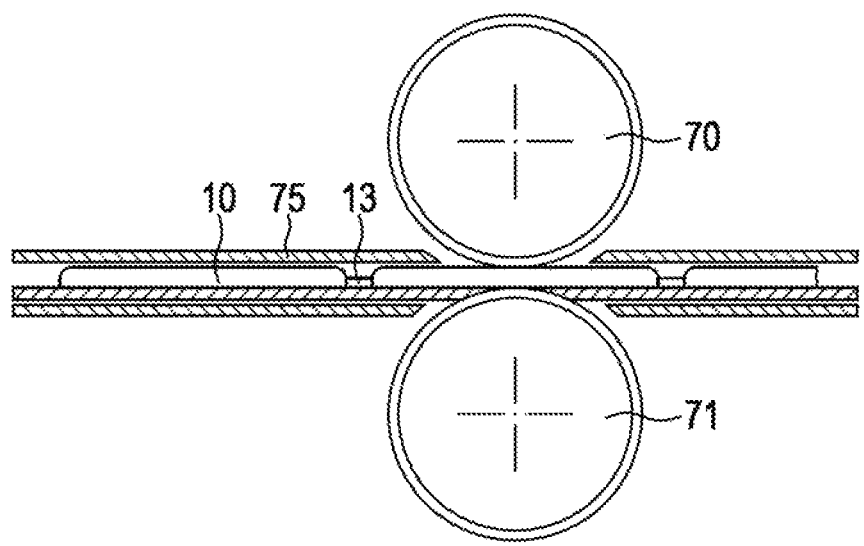
FIG. 6 shows another dual wheel drive.

In FIG. 6, a further embodiment of a dual wheel drive is shown. Here, first and second transport wheels 70, 71 are in contact with the broad sides (e. g. top and bottom side) of the balancing weights. Furthermore, the balancing weight is guided in a slide rail 75.

Figure 7:
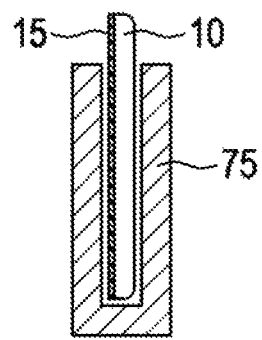
FIG. 7 shows a vertical slide rail.

In FIG. 7, a vertical slide rail 75 is shown, transporting the balancing weights in a vertical position.

Figure 8:
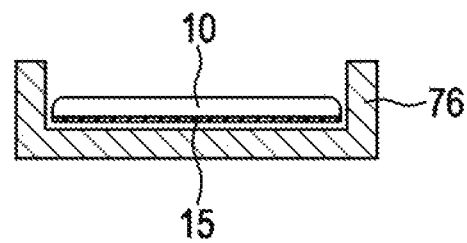
FIG. 8 shows a horizontal slide rail.

In FIG. 8, a horizontal slide rail 76 is shown, transporting balancing weights in a horizontal position. Generally, there may be at least one section of a slide rail and a section of any of the drive means like rollers, belts or support belts as disclosed herein. There may also be a consecutive sequence of sections of slide rails and section of any of the drive means.

All the slide rails disclosed herein are preferably have a low-friction surface, which may for example be coated with a PTFE.

Figure 9:
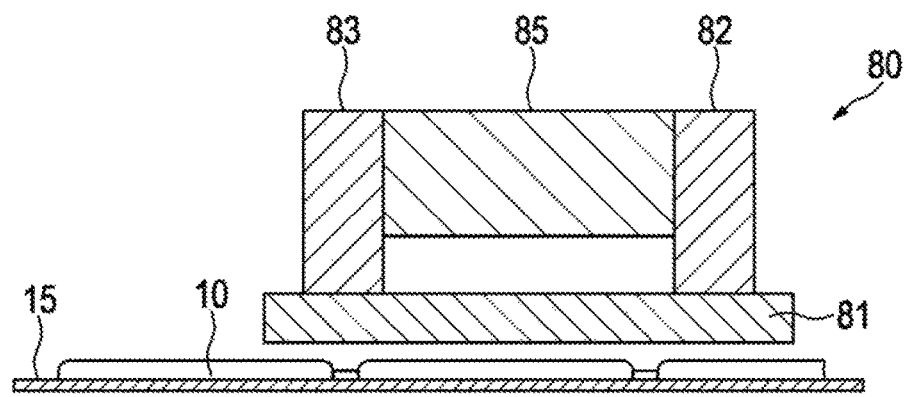
FIG. 9 shows a magnetic suspension of balancing weights.

In FIG. 9, a magnetic suspension 80 of balancing weights is shown. For such as suspension to work, it is essential that the chain of balancing weights comprises magnetic materials, preferably soft-magnetic materials. Preferably, the balancing weights comprise iron or similar materials. Alternatively the tape 15 may comprise magnetic material. The magnetic suspension 80 comprises at least a magnet 85 which may be a permanent magnet or an electrical coil, or a combination thereof. Furthermore, it is preferred to have yokes 82, 83 for guiding the magnetic flux. To prevent sticking of the balancing weights to the yokes and to control the magnetic field, it is preferred to have a spacer 81 between the yoke and the balancing weights. This spacer preferably is of a non-magnetic material, like plastic. Most preferably, the spacer 81 has a surface towards the balancing weights with low-friction characteristics. It may be coated with a material like PTFE. In an alternate embodiment, the spacer may be made of a material with low-friction, like PTFE.

Figure 10:
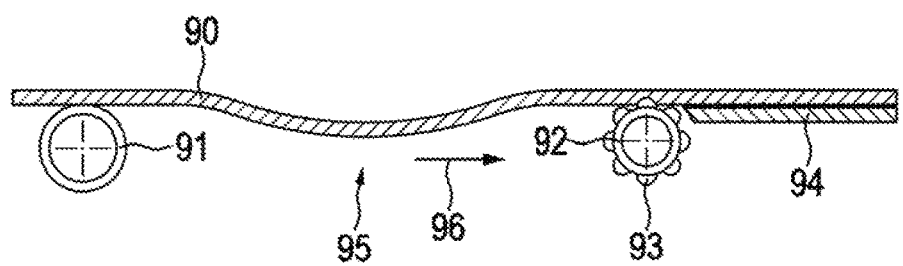
FIG. 10 shows an assembly with two wheels for equalizing flow of balancing weights.

FIG. 10 shows an assembly with two wheels for equalizing flow of balancing weights. First, transport wheel 91 drives the chain of balancing weights 90 towards a second positioning wheel 92, which preferably has a plurality of cams to interact with gaps between the balancing weights. Precision positioning and transport is made by the positioning wheel. The speed of the transport wheel and the positioning wheel may be different, resulting in an excess length 95 of the chain of balancing weights. It is preferred that a support 94 is provided after the positioning wheel 92 to provide for a precise guiding of the balancing weights.

Figure 11:
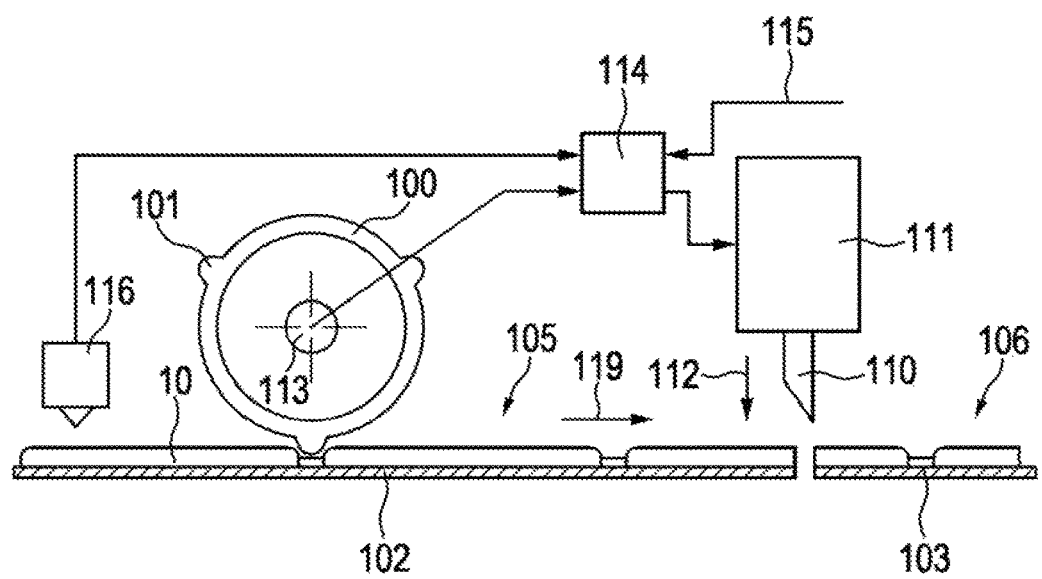
FIG. 11 shows a precision balancing weight delivery system.

In FIG. 11, a precision balancing weight delivery system is shown. Balancing weights 10 are transported in direction 119 by means of a transport wheel 100, which preferably has a plurality of cams 101. In this embodiment a slightly modified transport wheel is shown, although any of the transport wheels and/or transport belts as disclosed herein may be used. Basically the transport wheel has a surface generating friction with the balancing weights 10. Due to the cams 101, synchronizing with gaps between the balancing weights, a precision transport can be achieved. Furthermore it is preferred, if a cutter 110 is provided for cutting pieces of the balancing weights as transported by the transport wheel. The cutter 110 may be controlled and driven by cutter drive 111, which controls movement of the cutter in direction 112 through the balancing weights. A control unit 114 may be provided to control the cutter drive, and therefore to control cutting operation. Preferably, the control unit receives a signal from a sensor 113, giving the position and/or movement, or any other related parameter of transport wheel 100, thus indicating the length or mass or number of transported balancing weights. In addition or as an alternative, a sensor 116 for sensing the number of balancing weights, or for measuring the balancing weight length, may be provided. In a preferred embodiment, the sensor 116 detects gaps between balancing weights. The control unit 114 preferably receives an input signal 115 of requested weight from an external unit, like a wheel balancing machine. It calculates the necessary length and/or number of balancing weights, and controls transport wheel 100 to transport the necessary amount of balancing weight into direction 119 towards the cutter. Then, the cutter drive 111 is controlled to drive the cutter 110 to cut off the required amount of balancing weight. It is preferred, if a support 102 is provided for uncut balancing weights 105, and a support 103, which may be the same parts, is provided to cut off balancing weights 106.

Figure 12:
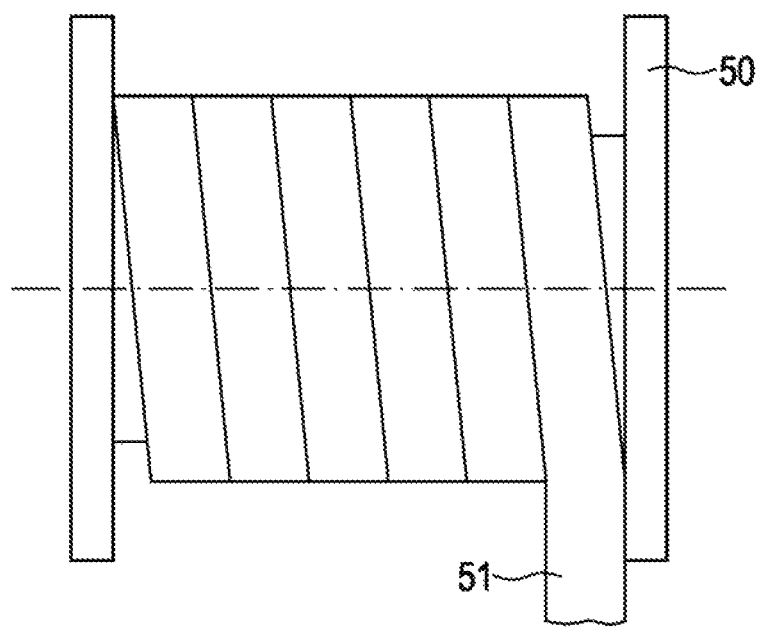
FIG. 12 shows a wheel with a belt of balancing weights.

FIG. 12 shows a reel with a belt 51 of balancing weights. Due to the flexibility of the balancing weights as shown in FIG. 1, these also may be bent in a second axis, and therefore they can be wound up on a reel 50, as shown in FIG. 12.

It will be appreciated to those skilled in the art having the benefit of this disclosure that this invention is believed to provide balancing weights for vehicle wheels, apparatus and methods for transporting and positioning of balancing weights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 balancing weight
11, 12 sides
13 bridge
15 tape
16 liner
17, 18 bending direction
20 transport wheel
21 transport cam
30 transport belt
31, 32 transport pulley
33 transport cam
40 belt support
41, 42 support pulley
50 reel
51 balancing weights on tape
60, 61 transport wheel
62, 63 direction of force
65 support rail
70, 71 transport wheel
75 vertical slide rail
76 horizontal slide rail
80 magnetic suspension
81 spacer
82, 83 yoke
85 magnet
90 chain of balancing weights
91 transport wheel
92 positioning wheel
93 cam
94 support
95 length compensation
96 transport direction
100 transport wheel
101 transport cam
102, 103 support
105 balancing weights
110 cutter
111 cutter drive
112 cutter movement
113 sensor
114 control unit
115 weight request input
116 balancing weight sensor
119 transport direction

The invention claimed is:

1. System for transporting and positioning pre-formed balancing weights that are connected together to form a chain of pre-formed balancing weights, the system comprising:
   a plurality of pre-formed balancing weights that are connected together to form a chain of pre-formed balancing weights in which each of the weights is separated from an adjacent one of the weights by a gap; and
   at least one drive means comprising a transport belt, the transport belt having a plurality of cams configured to interface with the gaps between the pre-formed balancing weights, without forming or deforming the pre-formed balancing weights;
   where a distance between two adjacent ones of the cams corresponds to a distance between two of the gaps such that the two adjacent ones of the cams will each fit into one of the two gaps when the at least one drive means interacts with the pre-formed balancing weights.

2. The system of claim 1, wherein the pre-formed balancing weights are connected by an adhesive tape.

3. The system of claim 1, further comprising a cutter disposed such that the at least one drive means is configured to transport the pre-formed balancing weights toward the cutter, the cutter configured to cut pre-formed balancing weights or parts thereof from the chain of pre-formed balancing weights.

4. The system of claim 1, where an external surface of the transport belt is flexible.

5. The system of claim 4, where the external surface of the transport belt is softer than the plurality of balancing weights.

6. The system of claim 1, where the at least one drive means is configured to move the chain of balancing weights in a transport direction without generating pressure on upper surfaces of the plurality of balancing weights.

7. System for transporting pre-formed balancing weights that are connected together to form a chain of pre-formed balancing weights, the system comprising:
   a plurality of pre-formed balancing weights that are connected together to form a chain of pre-formed balancing weights in which each of the weights is separated from an adjacent one of the weights by a gap; and
   at least one drive means comprising a transport belt configured to directly interact with the chain of pre-formed balancing weights to transport the chain of pre-formed balancing weights, the transport belt having a plurality of cams configured to interface with the gaps between the pre-formed balancing weights;

where a distance between two adjacent ones of the cams corresponds to a distance between two of the gaps such that the two adjacent ones of the cams will each fit into one of the two gaps when the at least one drive means interacts with the pre-formed balancing weights.

8. The system of claim 7, wherein the at least one drive means is preceded or followed by at least one slide rail.

9. The system of claim 8, comprising a sequence of slide rails and drive means.

10. The system of claim 7, wherein the pre-formed balancing weights are connected by an adhesive tape.

11. The system of claim 7, further comprising a cutter disposed such that the at least one drive means is configured to transport the pre-formed balancing weights toward the cutter, the cutter configured to cut pre-formed balancing weights or parts thereof from the chain of pre-formed balancing weights.

12. The system of claim 7, where an external surface of the transport belt is flexible.

13. The system of claim 12, where the external surface of the transport belt is softer than the plurality of balancing weights.

14. The system of claim 7, where the at least one drive means is configured to move the chain of balancing weights in a transport direction without generating pressure on upper surfaces of the plurality of balancing weights.

15. Method for transporting and positioning pre-formed balancing weights that are connected together to form a chain of pre-formed balancing weights in which each of the weights is separated from an adjacent one of the weights by a gap, the method comprising the steps of:

driving the chain of balancing weights by a transport belt having a plurality of cams configured to interface with the gaps between adjacent ones of the pre-formed balancing weights; and interfacing by at least one cam of the transport belt with a gap between two adjacent ones of the pre-formed balancing weights to synchronize movement between the transport belt and the chain of pre-formed balancing weights, without forming or deforming the pre-formed balancing weights;

where a distance between two adjacent ones of the cams corresponds to a distance between two of the gaps such that the two adjacent ones of the cams each fit into one of the two gaps as the chain of balancing weights is driven.

16. The method of claim 15, wherein the pre-formed balancing weights are connected by an adhesive tape.

17. The method of claim 15, further comprising:

transporting with the transport belt the pre-formed balancing weights toward a cutter that is configured to cut pre-formed balancing weights or parts thereof from the chain of pre-formed balancing weights; and cutting the chain of pre-formed balancing weights with the cutter.

18. The method of claim 15, where an external surface of the transport belt is flexible.

19. The method of claim 18, where the external surface of the transport belt is softer than the pre-formed balancing weights.

20. The method of claim 15, where the chain of pre-formed balancing weights is moved in a transport direction without generating pressure on upper surfaces of the pre-formed balancing weights.

* * * * *